US009652025B2

(12) United States Patent
Sakashita

(10) Patent No.: US 9,652,025 B2
(45) Date of Patent: May 16, 2017

(54) COMMUNICATION DEVICE

(71) Applicant: SEIKO EPSON CORPORATION, Tokyo (JP)

(72) Inventor: Shinya Sakashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 14/476,235

(22) Filed: Sep. 3, 2014

(65) Prior Publication Data

US 2015/0089256 A1    Mar. 26, 2015

(30) Foreign Application Priority Data

Sep. 24, 2013  (JP) ................................. 2013-196658

(51) Int. Cl.
| | | |
|---|---|---|
| *G06F 1/32* | (2006.01) | |
| *G06F 13/10* | (2006.01) | |
| *G06F 13/38* | (2006.01) | |

(52) U.S. Cl.
CPC ............ *G06F 1/3234* (2013.01); *G06F 13/10* (2013.01); *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,965,955 B1 | 11/2005 | Nishiyama | |
| 2007/0005947 A1* | 1/2007 | Chartrand | G06F 9/4418 713/1 |
| 2014/0211678 A1* | 7/2014 | Jafarian | H04W 52/0216 370/311 |

FOREIGN PATENT DOCUMENTS

| | | |
|---|---|---|
| JP | 2000-347980 A | 12/2000 |
| JP | 2008-046858 A | 2/2008 |

OTHER PUBLICATIONS

Universal Serial Bus Specification Revision 2.0; Apr. 27, 2000.
IEEE Standard for Data Delivery and Logical Channels for IEEE 1284 Interfaces; Jun. 21, 2000.

* cited by examiner

*Primary Examiner* — Kim Huynh
*Assistant Examiner* — Joshua Neveln
(74) *Attorney, Agent, or Firm* — Global IP Counselors, LLP

(57) ABSTRACT

A communication device configured to performing communication with an external device. The communication device includes a calculation unit, a recording unit configured to record a first firmware that makes the calculation unit function in a first mode, and a second firmware that makes the calculation unit function in a second mode that is different from the first mode, and a communication unit, when the calculation unit receives a signal from the external device in a designated state switching from execution of the first firmware to execution of the second firmware, configured to make a response not according to contents of the received signal.

5 Claims, 5 Drawing Sheets

NORMAL STATE

| CORE | PROCESS |
|---|---|
| CORE 101 | PRINTING MECHANISM CONTROL |
| CORE 102 | NWIF CONTROL |
| CORE 103 | USBIF CONTROL, PRINT DATA ANALYSIS |

Fig. 3A

POWER SAVING STATE

| CORE | PROCESS |
|---|---|
| CORE 101 | USBIF CONTROL, NWIF CONTROL |

Fig. 3B

COMMUNICATION DEVICE

CROSS-REFERENCE TO RELATED APPLICATIONS

This application claims priority to Japanese Patent Application No. 2013-196658 filed on Sep. 24, 2013. The entire disclosure of Japanese Patent Application No. 2013-196658 is hereby incorporated herein by reference.

BACKGROUND

Technical Field

The present invention relates to a communication device for performing data communication with an external device.

Related Art

From the past, known are communication devices that perform communication with an external device connected using a communication path. As an example, disclosed is a communication device that performs communication with an external device using a communication path according to USB standards (see JP-A-2008-46858 (Patent Document 1), for example).

Also, with the communication device, when designated conditions are established, there are also items known which transition to a power saving state for reducing power consumption. With the power saving state, for example, by stopping the supply of power for circuits for which power consumption is high, the overall device power consumption is reduced.

However, even in the power saving state, when data sending from an external device is performed, it is necessary to output a response signal to the sent data. Because of that, the communication device had a constitution for which it was possible to receive data or the like from the external device even in the power saving state.

SUMMARY

In the transition state in which the communication device is moving between the normal operating state (normal mode) and the power saving state (power saving mode), even when the external device sends data, it is not possible for the calculation device to handle this due to switching of the program, so there are cases when the communication device cannot respond to this data. The external device counts the time from when the data is sent until the response is received. Then, when a designated time elapses for the count, the external device detects a time out error.

Despite this kind of switching between the normal mode and the power saving mode, during a change period of a mode change such as one for which the calculation device cannot deal with the external device, there are cases when the external device sends data and a time out error is detected. Among external devices, there are also items for which time out errors are not expected due to transition states, so there are cases when unexpected communication failures are caused due to this time out error.

The present invention is conceived in light of the aforementioned problems, and an advantage is to reduce the occurrence of communication failure during mode switching transition periods.

To address the aforementioned problems, one aspect of the present invention is a communication device configured to perform communication with an external device. The communication device includes a calculation unit, a recording unit configured to record a first firmware that makes the calculation unit function at a first power consumption, and a second firmware that makes the calculation unit function at a second power consumption that is different from the first power consumption, and a communication unit, when receiving a signal from the external device in a transition state in which the calculation unit switches from execution of the first firmware to execution of the second firmware, configured to respond with NULL to the received signal.

With the invention constituted as noted above, to switch the communication device from the normal state to the power saving state, in the transition state switching firmware from first firmware to second firmware, when the communication unit receives signals from the external device, NULL is responded to the received signal. Because of that, it is possible to avoid a NAK response to the external device, and possible to suppress communication failure.

The communication unit can be an item using any kind of communication method.

Also, with one aspect of the present invention, the calculation unit has a first functional unit, a second functional unit, and a third functional unit. When the first firmware is executed, the first to third functional units are made to function. In the transition state, the communication unit is controlled by the third functional unit, and the third functional unit is stopped after the first functional unit and the second functional unit are stopped. When the second firmware is executed, the first functional unit is made to function, and is made to control the communication unit.

With the invention constituted as noted above, in the transition state switching from the first firmware to the second firmware, after stopping the third functional unit that controls the communication unit, and being switched to the second firmware, it is possible to have the communication unit controlled by the first functional unit. Thus, it is possible to shorten the period for which it is not possible for the communication unit to function.

Also, with one aspect of the present invention, the calculation unit, when switching from the second firmware to the first firmware, has the communication unit controlled by the first functional unit, and stops the first functional unit after a designated period, and after that, the calculation unit make the first to third functional units return.

With the invention constituted as noted above, even in the transition state for switching from the second firmware to the first firmware to switch the communication device from the power saving state to the normal state, when the communication unit receives signals from the external device, NULL is responded to the received signal.

Because of that, it is possible to avoid a NAK response to the external device, and possible to suppress communication failure.

With one aspect of the present invention, the communication unit performs communication according to USB standards.

With the invention constituted as noted above, when there is communication according to USB standards that does not handle the NAK response, it is possible to suppress communication failure.

BRIEF DESCRIPTION OF THE DRAWINGS

Referring now to the attached drawings which form a part of this original disclosure:

FIGS. 3A and 3B are diagrams for describing the process of executing each core of a CPU 10 in a normal state and a power saving state;

DETAILED DESCRIPTION OF EMBODIMENTS

Figure 1:
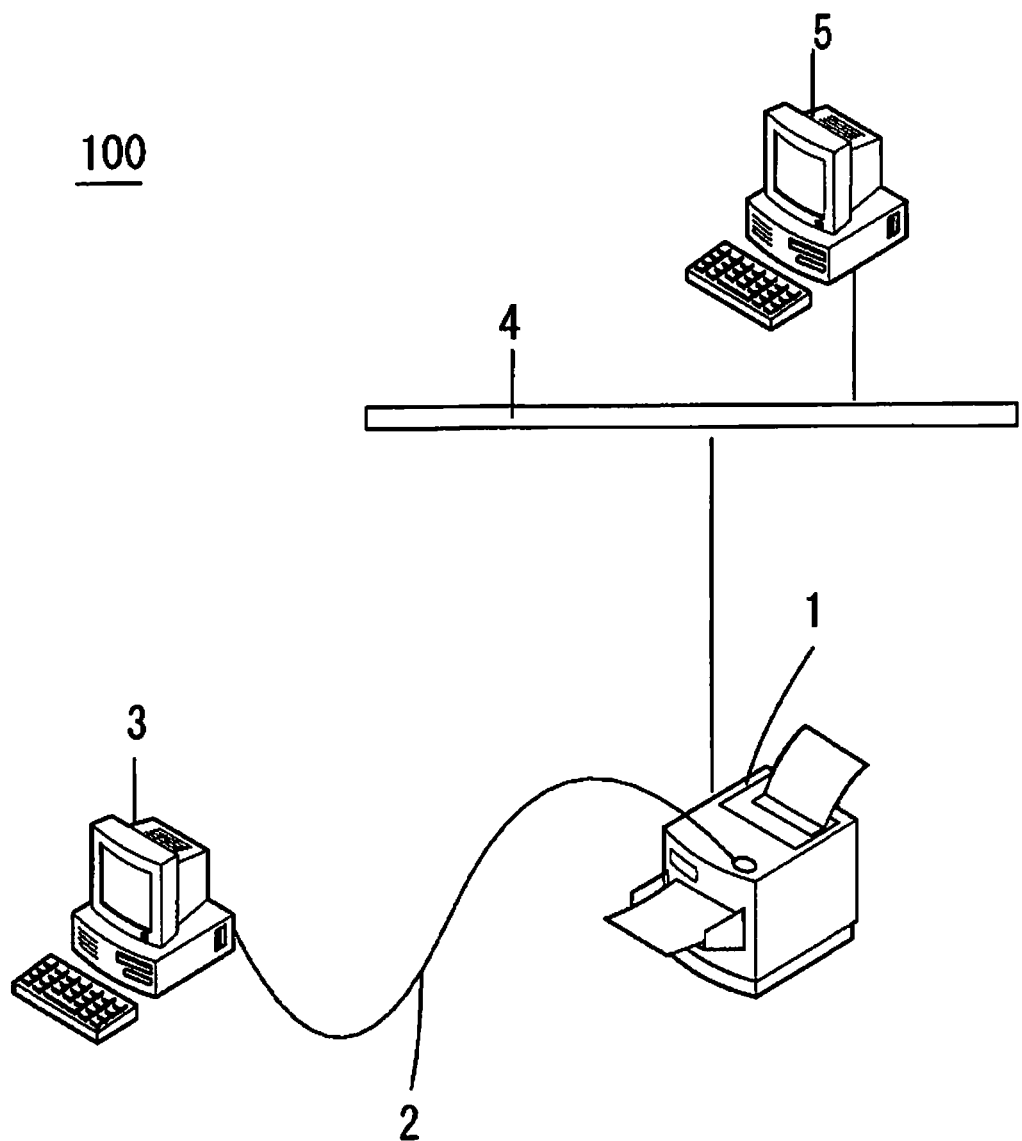
FIG. 1 is a perspective view for describing a communication system 100.

Hereafter, selected embodiments of the present invention will be described according to the following sequence.
1. First Embodiment:
1.1. Communication Device Configuration:
1.2. Transition to the Power Saving State:
1.3. Return to the Normal State:
2. Other Embodiments
1. First Embodiment:
1.1. Communication Device Configuration:

FIG. 1 is a perspective view for describing a communication system 100.

The communication system 100 is equipped with a printer 1, a PC (external device) 3, and a PC (external device) 5. With this embodiment, we will use the printer 1 to describe an example of the communication device.

The printer 1 and the PC 5 are connected to be able to communicate using a network 4 such as a LAN (Local Area Network), the internet or the like. Also, the printer 1 and the PC 3 are connected to be able to communicate using a USB (Universal Serial Bus) standard communication path 2. The communication path 2 or the network 4 are general names of the communication path that is wired or wireless.

Figure 2:
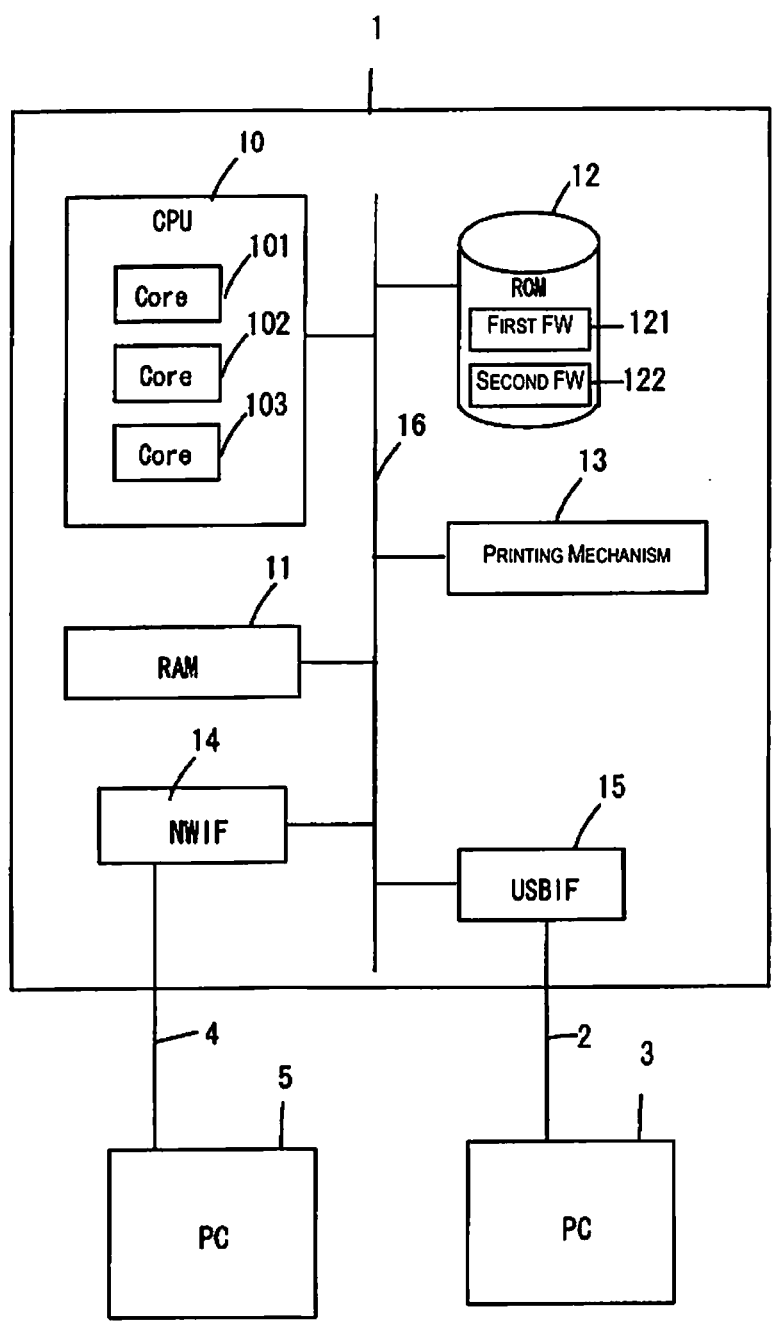
FIG. 2 is a block schematic diagram for describing the constitution of a printer 1.

FIG. 2 is block schematic diagram for describing the constitution of the printer 1.

The printer 1 is constituted equipped with a CPU (Central Processing Unit) 10, a RAM (Random Access Memory) 11, a ROM (Read Only Memory) 12, a printing mechanism 13, an NWIF 14, and a USBIF 15. Also, the CPU 10 is electrically connected to each part through a bus 16.

The CPU (calculation unit) 10 comprehensively controls the driving of the printer 1 by executing on the RAM 11 firmware (hereafter also noted as FW) recorded in the ROM 12. Also, the CPU 10 has respectively independently functioning core (first functional unit) 101, core (second functional unit) 102, and core (third functional unit) 103.

A first FW 121 and a second FW 122 which are programs executed by the CPU 10 are recorded in the ROM 12. The first FW 121 is a program executed by the CPU 10 when the printer 1 is in a normal state. Also, the second FW 122 is a program executed by the CPU 10 when the printer 1 is in a power saving state.

Because of that, the recording unit of the present invention is realized using the ROM 12. In addition to this, for example when the printer 1 is equipped with memory such as an HDD (Hard Disk Drive) or the like, it is also possible to have the first FW 121 and the second FW 122 recorded in this HDD. Also, the first FW 121 and the second FW 122 can also be recorded in respectively different locations (memory).

FIGS. 3A and 3B are diagrams describing the process executed by each core of the CPU 10 in the normal state and the power saving state. FIG. 3A shows the functions allocated to each core 101 to core 103 when the CPU 10 executes the first FW 121 (normal state). FIG. 3B shows the functions allocated to each core 101 to core 103 when the CPU 10 executes the second FW 122 (power saving state). In FIGS. 3A and 3B, the case of the functioning of the cores stopping is not noted.

When the CPU 10 shown in FIG. 3A is in a normal state executing the first FW 121, all of core 101 to core 103 are operating. Also, the core 101 is allocated for the control of the printing mechanism 13. Also, the core 102 is allocated for the control of the NWIF 14. Also, the core 103 is allocated for the process of analyzing the USBIF 15 and the print data.

With the power saving state shown in FIG. 3B for which the CPU 10 executes the second FW 122, only the core 101 functions, and the operation of the other cores 102 and 103 is stopped. Here, having the operation stop means that the power consumption of the core becomes low or the driving of the core stops by reducing the drive power supplied from a power supply circuit (not illustrated). Because of that, in the power saving state, the power consumption of the CPU 10 decreases. Also, in the power saving state, the core 103 is allocated for the control of the NWIF 14 and for the control of the USBIF 15.

Here, with this embodiment, the core 101 that is driven in the power saving state has its power consumption in the normal state become the lowest compared to the power consumption of the other cores 102 and 103. As a result, it is possible to reduce the power consumption in the power saving state.

Returning to FIG. 2, in the normal state, the printing mechanism 13 forms an image on paper based on print data decoded by the core 103 of the CPU 10. This print data is fetched through the NWIF 14 or the USBIF 15, for example.

The printing mechanism 13 has a conveyance mechanism (not illustrated) and a print head (not illustrated). The print head for example is connected to a cartridge corresponding to each type of liquid including cyan, magenta, yellow, black, light cyan, light magenta, and gray, and ink supplied from each cartridge is discharged.

The conveyance mechanism is equipped with a paper feed motor and a paper feed roller, and in the normal state, by the drive being controlled by the core 101 of the CPU 10, the matter to be printed is conveyed along the feed direction which is the direction in which the paper is conveyed.

The NWIF (Network Inter Face) 14 is constituted from a well known LAN board or a LAN card, for example. The NWIF 14 functions as an interface according to the TCP/IP protocol that connects the printer 1 to the network 4. In the normal state, the NWIF 14 is controlled by the core 102 of the CPU 10, and performs data and command communication. Also, in the power saving state, the NWIF 14 is controlled by the core 101 of the CPU 10 and performs receiving of data and commands.

The USBIF (Universal Serial Bus Inter Face) 15 is constituted by a well known USB board, for example. The USBIF 15 is detachably connected with the communication path 2 using a connector, and functions as the interface according to the USB method that connects the PC 3 and the printer 1. In the normal state, the USBIF 15 is controlled by the core 103 of the CPU 10, and performs data and command communication. Also, in the power saving state, the USBIF 15 is controlled by the core 101 of the CPU 10 and performs data and command communication. With this embodiment, the USBIF 15 functions as the communication unit.

Figure 4:
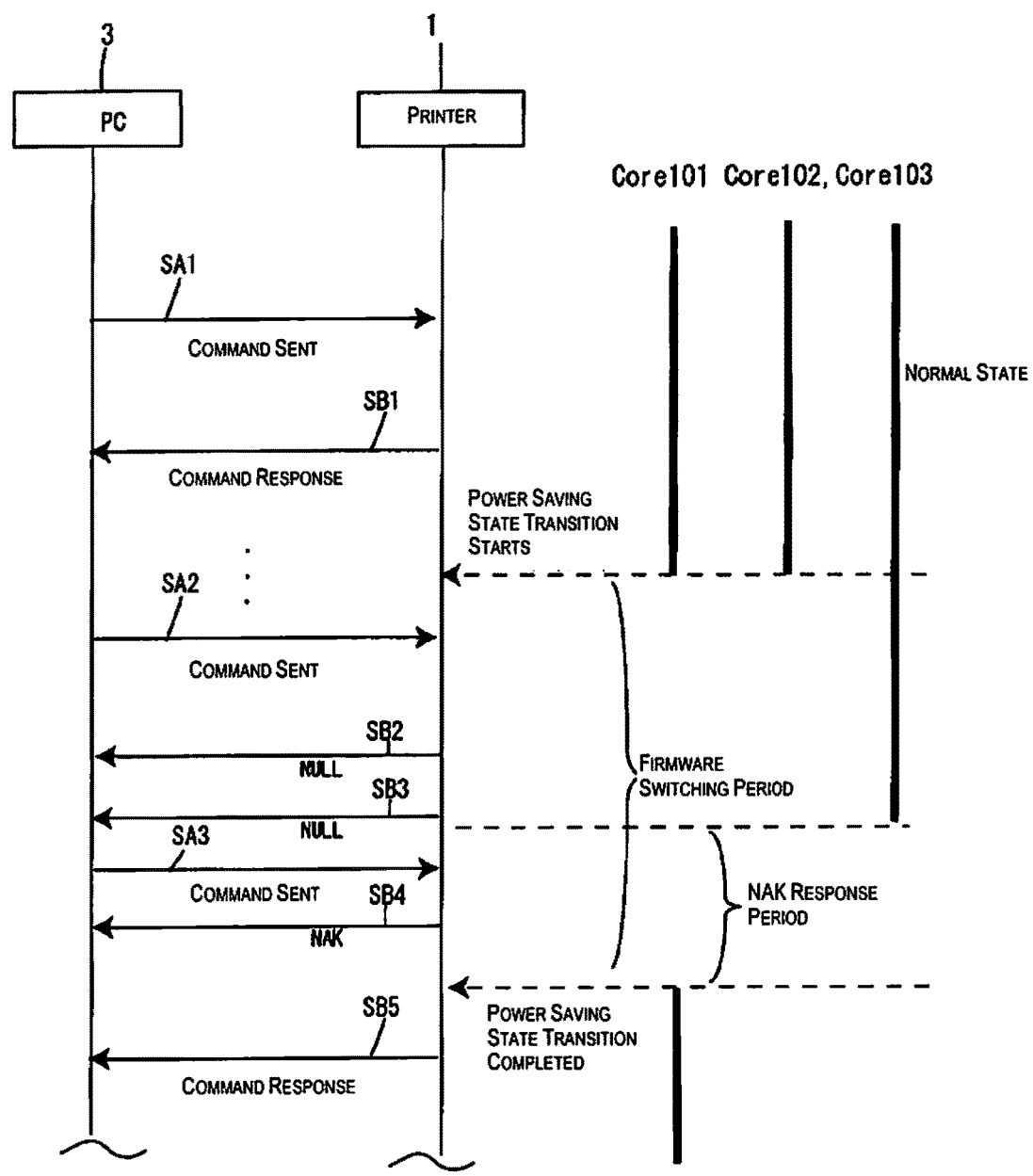
FIG. 4 is a timing chart for describing the transition from the normal state to the power saving state.

1.2. Transition to the Power Saving State:

FIG. 4 is a timing chart for describing the transition from the normal state to the power saving state. The left side of the drawing shows communication between the PC 3 and the printer 1, the right side of the drawing shows the operation or stopping of core 101 to core 103. In specific terms, the period when the core 101 to the core 103 are operating is marked with a solid line, and the period when they are stopped is not marked with a solid line.

First, in the normal state of the printer 1, when there is sending of a command according to USB standards from the PC 3 through the communication path 2 (step SA1), the CPU 10 (core 103) of the printer 1 controls the USBIF 15 and performs a command response (step SB1). Said another way, when a command is sent, the core 103 executes in cooperation with a mechanism related to commands such as the core 101, the core 102, the printing mechanism 13 or the like. After that, the core 103 performs a command response corresponding to the processing results. In the right side of FIG. 4 as well, in the normal state, all of core 101 to core 103 are operating.

Next, when conditions are established for transitioning to the power saving state, the CPU 10 switches the first FW 121 for the normal state recorded in the RAM 11 to the second FW 122 for the power saving state. Because of that, each core 101 to core 103 of the CPU 10 stops in sequence. With this embodiment, the stopping sequence of the core 101 to the core 103 is that after the core 101 and the core 102 stop first, and the core 103 stops last.

In other words, first, the core 102 that does not operate in the power saving state and the core 101 that does operate in the power saving state stop. Next, the core 103 that controls the USBIF 15 is the last to stop.

Next, during the firmware switching period (transition period to the power saving state, in particular, the period during which at least a portion of the mechanism relating to the process does not operate), when there has been sending of a command (signal) from the PC 3 (step SA2), the core 103 controls the USBIF 15 and performs a NULL response (steps SB2, SB3). Said another way, in this period, when a command has been sent, the core 103 cannot execute the process corresponding to the command. Because of that, the core 103 performs a NULL response regardless of the command process results. The PC 3 counts the period from when the command is sent until there is a response from the printer 1, so when there is a NULL response from the core 103, the count does not time out.

After that, just before the end of switching from the first FW 121 to the second FW 122, the recording destination of the first FW 121 moves from the RAM 11 to the ROM 12, so the core 103 stops (NAK response period). In this state, when there is a command sent from the PC 3 to the printer 1 (step SA3), the USBIF 15 of the printer 1 performs a NAK response to the PC 3 (step SB4). However, after that, the firmware switching period ends, and there is a transition to the power saving state, so the core 101 operates. After that, the core 101 controls the USBIF 15, and performs a command response to the PC 3 (step SB5).

Because of that, though there is a period for performing a NAK response from the printer 1 to the PC 3, it is possible to make that period shorter and to suppress PC 3 time outs.

Here, as a firmware switching method from the first FW 121 to the second FW 122, various items can be envisioned. For example, in a state with the first FW 121 recorded in the RAM 11, as a background process, it is possible to have the second FW 122 recorded in the RAM 11, and have the core 101 read the second FW 122 from the RAM 11. In addition to this as well, after evacuating the first FW 121 from the RAM 11, it is also possible to have the second FW 122 recorded in the RAM 11, and for the core 101 to read the second FW 122.

Figure 5:
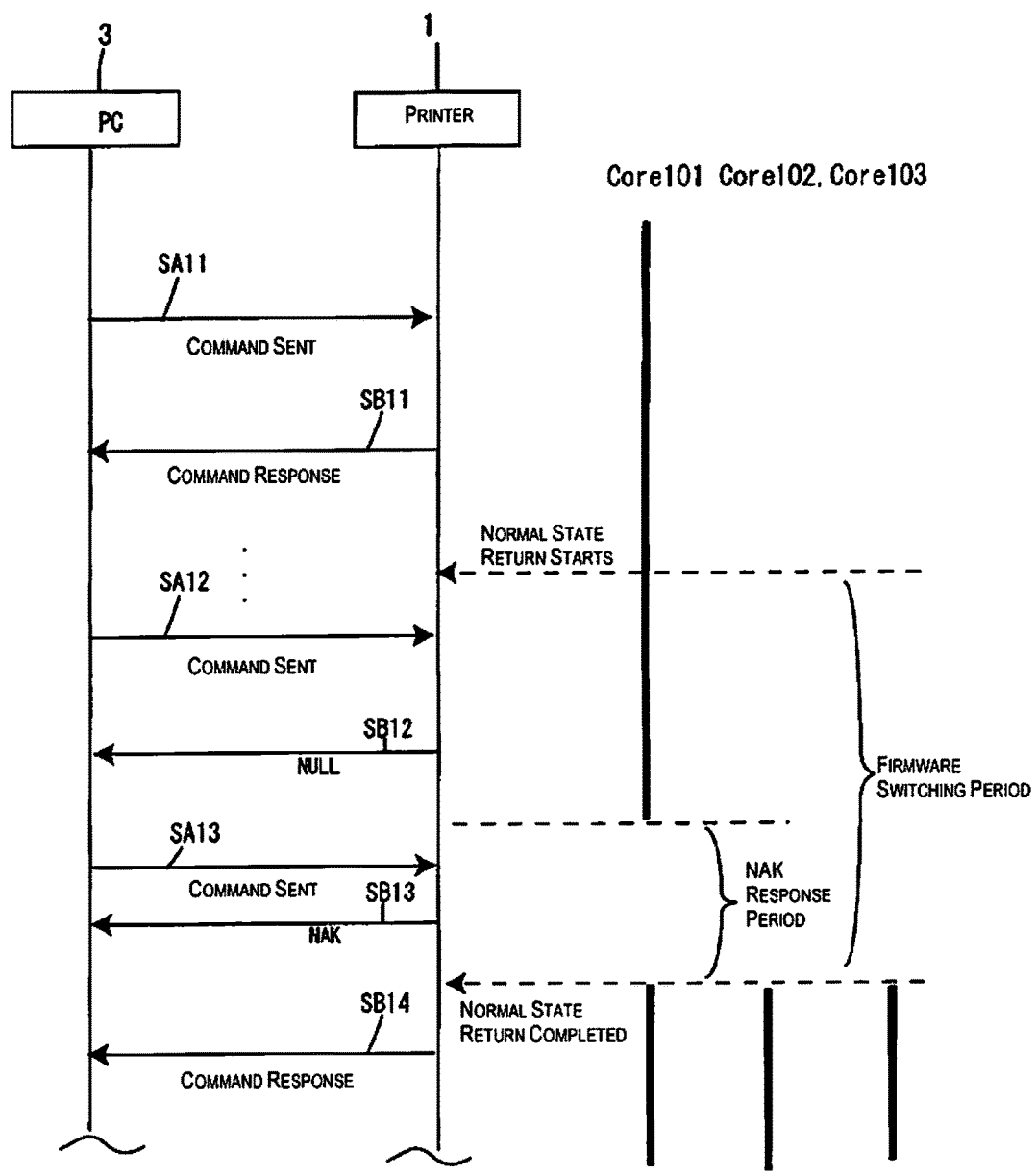
FIG. 5 is a timing chart for describing the return from the power saving state to the normal state.

1.3. Return to the Normal State:

FIG. 5 is a timing chart for describing the return from the power saving state to the normal state. The left side of the drawing shows communication between the PC 3 and the printer 1, and the right side of the drawing shows the functioning or stopping of core 101 to core 103. In specific terms, the period when core 101 to core 103 are operating is shown with a solid line marked, and the period when they are stopped is shown without a solid line marked.

In the power saving state of the printer 1, when there is sending of a command from the PC 3 through the communication path 2 (step SA11), the operating core 101 controls the USBIF 15 and performs a command response (step SB11).

Next, when conditions are established for returning to the normal state, the CPU 10 switches the second FW 122 for the power saving state recorded in the RAM 11 to the first FW 121 for the normal state. Because of that, each core 102 and core 103 of the CPU 10 return in sequence. With this return to the normal state, first, the core 101 operates until just before the FW switching is completed. After that, after the core 101 has stopped once, all of core 101 to core 103 return.

Because of that, during the firmware switching period (period returning to the normal state), when there has been sending of a command from the PC 3 (step SA12), the core 101 controls the USBIF 15 and performs a NULL response (step SB12). The PC 3 counts the period from after the command is sent until there is a response from the printer 1, so when there is a NULL response from the core 101, time out does not occur.

After that, just before the end of switching from the second FW 122 to the first FW 121, the recording destination of the second FW 122 moves from the RAM 11 to the ROM 12, so the core 101 stops (NAK response period). In this state, when there is a command sent from the PC 3 to the printer 1 (step SA13), the USBIF 15 of the printer 1 performs a NAK response to the PC 3 (step SB13). However, after that, the firmware switching period ends, and to return to the normal state, all of core 101 to core 103 return.

After that, a command response is performed from the core 101 to the PC 3 (step SB14).

Because of that, in a period returned to the normal state as well, though there is a period for which a NAK response is performed from the printer 1 to the PC 3, that period can be made shorter, and it is possible to suppress time out of the PC 3. Because of that, with USB standard communication which does not handle NAK response, it is possible to suppress communication failure.

Here, as a method of switching firmware from the second FW 122 to the first FW 121, the same as when transitioning to the power saving state, various items can be envisioned. For example, in a state with the second FW 122 recorded in the RAM 11, as the background process, it is possible to have the first FW 121 recorded in the RAM 11, and to have the cores 102 and 103 read the first FW 121 from the RAM 11. In addition to this, it is also possible to have an item for which after the second FW 122 is evacuated from the RAM 11, the first FW 121 is recorded in the RAM 11, and one of the cores 101 to 103 reads the first FW 121.

2. Other Embodiments:

The item responding with NULL during the firmware switching period is not limited to being the USBIF 15, but can also be the NWIF 14.

Also, the number of cores that the CPU 10 has is not limited to being three.

Also, using the printer as the communication device is merely an example, and it is possible to use various devices as long as it is an item that performs communication with an external device.

It goes without saying that the present invention is not limited to the embodiments noted above.

Even with switching of modes unrelated to power saving, it is possible to operate as with the embodiments noted above during change periods of mode changes such as when it is not possible for the calculation device to deal with the external device.

In addition, it is possible to change as appropriate the combinations of members and constitutions and the like that can be mutually interchanged disclosed in the embodiments above and in other embodiments, and to apply those.

It is also possible to interchange as appropriate members and constitutions that are known technology that are mutually interchangeable with the members and constitutions and the like disclosed in the embodiments noted above, and to change combinations thereof and apply those.

It is also possible to change as appropriate members and constitutions and the like disclosed in the embodiments noted above that would be known by a person skilled in the art based on known technology or the like with members and constitutions and the like that can be assumed to be substitutes, or to change combinations thereof and apply those.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A communication device configured to perform communication with an external device, the communication devise comprising:
    a processor;
    a memory that stores a first firmware that makes the processor function in a first mode, and a second firmware that makes the processor function in a second mode that is different from the first mode; and
    a communication circuit board that makes a response according to content of a signal from the external device during execution of the first firmware and execution of the second firmware, and makes a response not according to contents of the received signal when receiving a signal from the external device in a designated state in which the processor switches from execution of the first firmware to execution of the second firmware,
    the processor having a first functional unit, a second functional unit, and a third functional unit,
    when the first firmware is executed, the first to third functional units being made to function,
    in a transition state, the communication circuit board being controlled by the third functional unit, and the third functional unit being stopped after the first functional unit and the second functional unit are stopped, and
    when the second firmware is executed, the first functional unit being made to function, and being made to control the communication circuit board.

2. The communication device according to claim 1, wherein
    the communication unit is configured to respond with NULL in the designated state when a signal is received from the external device.

3. The communication device according to claim 1, wherein
    the processor, when switching from the second firmware to the first firmware, has the communication circuit board controlled by the first functional unit, and stops the first functional unit after a designated period, after which the processor make the first to third functional units return.

4. The communication device according to claim 1, wherein the communication circuit board communication according to USB standards.

5. The communication device according to claim 1, wherein
    the first mode is a normal operating mode, and
    the second mode is a power saving mode in which the power consumption is lower than the first mode.

* * * * *